(12) United States Patent
Suwa et al.

(10) Patent No.: US 7,225,528 B2
(45) Date of Patent: Jun. 5, 2007

(54) METHOD FOR MANUFACTURING MAGNETIC RECORDING MEDIUM

(75) Inventors: Takahiro Suwa, Tokyo (JP); Mitsuru Takai, Tokyo (JP); Kazuhiro Hattori, Tokyo (JP); Shuichi Okawa, Tokyo (JP)

(73) Assignee: TDK Corporation, Tokyo (JP)

( * ) Notice: Subject to any disclaimer, the term of this patent is extended or adjusted under 35 U.S.C. 154(b) by 422 days.

(21) Appl. No.: 10/972,325

(22) Filed: Oct. 26, 2004

(65) Prior Publication Data

US 2005/0086795 A1   Apr. 28, 2005

(30) Foreign Application Priority Data

Oct. 28, 2003   (JP)   .............................. 2003-367542

(51) Int. Cl.
G11B 5/127   (2006.01)
H01R 31/00   (2006.01)

(52) U.S. Cl. ............................... 29/603.16; 29/603.13; 29/603.15; 29/603.18; 360/77.08; 360/135; 427/127; 427/128

(58) Field of Classification Search ............. 29/603.13, 29/603.15, 603.16, 603.18; 360/77.08, 135; 427/127, 128
See application file for complete search history.

(56) References Cited

U.S. PATENT DOCUMENTS

| | | | |
|---|---|---|---|
| 6,391,213 B1 * | 5/2002 | Homola | ...................... 216/22 |
| 6,586,044 B1 * | 7/2003 | Takeshita et al. | ............ 427/129 |
| 6,773,782 B2 * | 8/2004 | Takeshita et al. | ......... 428/848.5 |

FOREIGN PATENT DOCUMENTS

| | | |
|---|---|---|
| JP | A 06-089895 | 3/1994 |
| JP | A 07-018431 | 1/1995 |
| JP | A 09-097419 | 4/1997 |
| JP | A 10-330937 | 12/1998 |
| JP | A 2000-311937 | 11/2000 |
| JP | A 2000-322710 | 11/2000 |

* cited by examiner

*Primary Examiner*—Paul D. Kim
(74) *Attorney, Agent, or Firm*—Oliff & Berridge, PLC

(57) ABSTRACT

A method for manufacturing a magnetic recording medium that has a sufficiently flat surface and includes a recording layer having a concavo-convex pattern that provides favorable accuracy of recording and reproduction. The manufacturing method includes the steps of: forming a lower non-magnetic film over a recording layer having a concavo-convex pattern; and forming an upper non-magnetic film on the lower non-magnetic film to fill concave portions 34 of the concavo-convex pattern. A bias power is applied to an object to be processed at least in the step of forming the upper non-magnetic film, and no bias power or a smaller bias power than the bias power applied in the step of forming the upper non-magnetic film is applied in the formation of the lower non-magnetic film.

12 Claims, 7 Drawing Sheets

METHOD FOR MANUFACTURING MAGNETIC RECORDING MEDIUM

BACKGROUND OF THE INVENTION

1. Field of the Invention

The present invention relates to a method for manufacturing a magnetic recording medium including a recording layer formed in a concavo-convex pattern.

2. Description of the Related Art

For a magnetic recording medium such as a hard disc, significant increase in areal density is conventionally achieved by various types of development that includes size reduction of magnetic particles forming a recording layer, change of material for the recording medium, and heightening precision of processing a head, for example, and further increase of the areal density is expected to continue.

However, problems such as side-fringes or crosstalk resulting from the limitation of the processing of heads or the spreading of magnetic fields have come to the surface, so that the conventional ways of improving the areal density have reached their limits. Thus, as a possible magnetic recording medium that can further increase the areal density, a discrete track magnetic recording medium has been proposed in which a recording layer is formed in a predetermined concavo-convex pattern and concave portions of the concavo-convex pattern are filled with anon-magnetic material (see Japanese Patent Laid-Open Publication No. Hei 9-97419, for example).

As a process technique for forming the recording layer in a predetermined concavo-convex pattern, dry etching such as reactive ion etching can be used (see Japanese Patent Laid-Open Publication No. Hei 12-322710).

Moreover, as means for filling a non-magnetic material, a deposition method such as a sputtering method, CVD (Chemical Vapor Deposition) method or an IBD (Ion Beam Deposition) method can be used. When such a deposition method is used, the non-magnetic material is deposited not only in the concave portions of the concavo-convex pattern but also on the upper surfaces of the convex portions. In addition, the surface of the deposited layer of non-magnetic material has a concavo-convex pattern that follows the concavo-convex pattern of the recording layer.

In order to obtain favorable magnetic characteristics, it is preferable that the non-magnetic material on the recording layer be removed so as to leave the non-magnetic material on the recording layer as little as possible. Moreover, in the case where the surface of the magnetic recording medium has a step, problems of unstable flying of the head, deposition of foreign particles on the magnetic recording medium, and the like may occur. Thus, it is preferable to flatten the surface of the recording layer while the excess non-magnetic material on the recording layer is removed. In order to remove the excess non-magnetic material on the recording layer and flatten the surface of the recording layer, a process technique such as a CMP (Chemical Mechanical Polishing) method, and oblique ion etching can be used. As the convex portions and the concave portions on the surface of the deposited non-magnetic material layer are smaller, it is easier to flatten the surface in a flattening process. Therefore, it is preferable to suppress the concavo-convex pattern on the surface of the deposited layer of the non-magnetic material to be as small as possible in the deposition process of the non-magnetic material.

In order to achieve this, a technique is known that deposits a non-magnetic material while a bias power is applied to an object to be processed (see Japanese Patent Laid-Open Publication No. 2000-311937, for example). In case of depositing the non-magnetic material while the bias power is applied, an action of depositing the non-magnetic material, and an action of etching the deposited non-magnetic material by gas or the like that is biased by the bias power, occur simultaneously. The non-magnetic material is deposited when the deposition action progresses more than the etching action. Etching tends to selectively remove the deposited non-magnetic material at a projecting portion thereof than at other portions, so that the projecting portion is etched faster than the other portions. Thus, due to this etching action, it is possible to suppress the formation of the concavo-convex pattern on the surface of the deposited non-magnetic film to be small in the deposition process of the non-magnetic material. Therefore, it is possible to flatten the surface of the deposited non-magnetic film efficiently and sufficiently in the flattening process.

However, in the deposition method with the bias power applied, the recording layer may be partially removed together with the non-magnetic material because of the etching action. This degrades the magnetic characteristics of the recording layer, thus degrading accuracy of recording and reproduction.

Moreover, in order to protect the recording layer in the flattening process, a stop film having a lower process rate in the flattening process may be formed on the recording layer. In this case, the non-magnetic material is deposited on the stop film. However, the stop film may be partially removed together with the non-magnetic material by the etching action during the deposition of the non-magnetic material. This damages the function of the stop film, thereby allowing the recording layer to be processed in the flattening process. Therefore, the magnetic characteristics of the recording layer are degraded.

SUMMARY OF THE INVENTION

In view of the foregoing problems, various exemplary embodiments of this invention provide a method for manufacturing a magnetic recording medium, which can efficiently and reliably manufacture a magnetic recording medium having a sufficiently flat surface and a recording layer with a concavo-convex pattern thereon that provides favorable accuracy of recording and reproduction.

According to various exemplary embodiments of the present invention, a lower non-magnetic film is formed over a recording layer having a concavo-convex pattern while no bias power is applied or an applied bias power is suppressed to be small, and thereafter an upper non-magnetic film is formed on the lower non-magnetic film while the bias power is applied. Thus, the aforementioned object is achieved. By forming the upper non-magnetic film while the bias power is applied, it is possible to suppress the concavo-convex pattern on the surface of the upper non-magnetic film to be small. Moreover, since the lower non-magnetic film is formed over the recording layer, the recording layer can be protected from etching in the formation of the upper non-magnetic film. Furthermore, since the bias power is suppressed to be smaller in the formation of the lower non-magnetic film than in the formation of the upper non-magnetic film, the recording layer can also be protected from etching in the formation of the lower non-magnetic film. Therefore, concave portions of the concavo-convex pattern can be filled with a non-magnetic material without degrading magnetic characteristics of the recording layer, so as to make the concavo-convex pattern on the surface small. Incidentally, in order to enhance an effect of preventing degradation of the magnetic characteristics of the recording layer, it is preferable to form the lower non-magnetic film without applying the bias power.

In case of forming a stop film, having a lower process rate in a flattening process, on the recording layer, since the lower non-magnetic film is formed on the stop film, the stop film can also be protected from etching in the formation of the upper non-magnetic film. Thus, it is possible to prevent degradation of the function of the stop film.

Accordingly, various exemplary embodiments of the invention provide a method for manufacturing a magnetic recording medium in which a recording layer is formed in a predetermined concavo-convex pattern over a substrate and concave portions of the concavo-convex pattern are filled with a non-magnetic material, the method comprising the steps of:

forming a lower non-magnetic film over the concavo-convex pattern; and forming an upper non-magnetic film on the lower non-magnetic layer, to fill the concave portions of the concavo-convex pattern with the non-magnetic material wherein a bias power is applied to the substrate at least in the step of forming the upper non-magnetic film, and in the step of forming the lower non-magnetic film, the bias power is suppressed to be smaller than that in the step of forming the upper non-magnetic film.

In the present application, the phrase "a recording layer is formed in a predetermined concavo-convex pattern over a substrate" is used to mean a case where the recording layer is formed over the substrate to be divided into a number of recording elements in a predetermined pattern, and concave portions are formed between the recording elements which are as convex portions; a case where the recording layer is formed over the substrate to be partially divided in a predetermined pattern, and concave portions are formed between the recording elements that partially continue as convex portions, for example a case where a continuous recording element, such as a spiral recording layer, is formed over a part of the substrate, and concave portions are formed between the recording element as convex portion; and a case where a continuous recording layer having both convex portions and concave portions is formed over the substrate.

Moreover, in the present invention, the term "magnetic recording medium" is used to mean not only a recording medium for which recording and reproduction of information are achieved only magnetically, such as a hard disc, a floppy (registered trade mark) disc, and a magnetic tape, but also a magneto optical disc which uses light and magnetism, such as an MO, and a recording medium with thermal assistance which uses magnetism and heat.

BRIEF DESCRIPTION OF THE DRAWINGS

Various exemplary embodiments of the present invention will be described in detail with reference to the accompanying drawings, wherein.

DETAILED DESCRIPTION OF THE PREFERRED EMBODIMENT

Various exemplary embodiments of this invention will be hereinafter described in detail with reference to the drawings.

Figure 1:
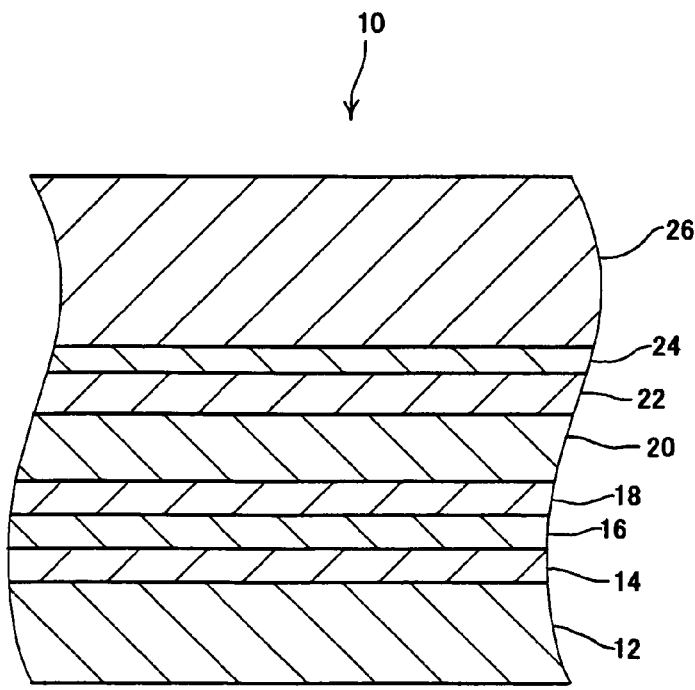
FIG. 1 is a side cross-sectional view schematically showing the configuration of a starting body of an object to be processed according to an exemplary embodiment of the present invention.
Figure 2:
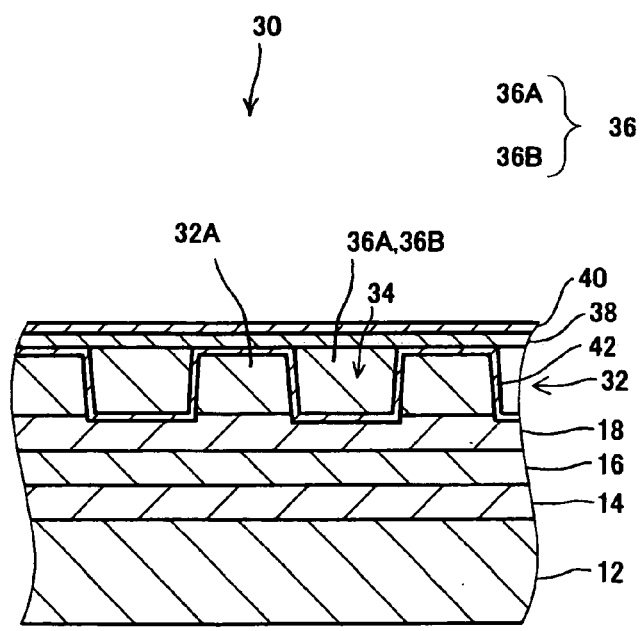
FIG. 2 is a side cross-sectional view schematically showing the configuration of a magnetic recording medium obtained by processing the object to be processed.

The present exemplary embodiment relates to a manufacturing method of a magnetic recording medium 30. In this exemplary embodiment, a starting body of an object to be processed 10 in which a continuous recording layer 20 and the like are formed over a glass substrate 12, as shown in FIG. 1 is processed to manufacture a magnetic recording medium 30. More specifically, the manufacturing method processes the object to be processed 10, thereby dividing the continuous recording layer 20 into a number of recording elements 32A so as to form a recording layer 32 in a predetermined concavo-convex pattern, as shown in FIG. 2, and filling concave portions 34 (concave portions of the concavo-convex pattern) between the recording elements 32A with a non-magnetic material 36. The manufacturing method has a feature in a process of filling of the non-magnetic material 36. The remaining processes do not necessarily seem important to understand this exemplary embodiment, and therefore the description thereof is omitted in an appropriate manner.

The starting body of the object to be processed 10 includes a glass substrate 12, and an underlayer 14, a soft magnetic layer 16, a seed layer 18, a continuous recording layer 20, a first mask layer 22, a second mask layer 24, and a resist layer 26 that are formed over the glass substrate 12 in that order.

The underlayer 14 has a thickness of 30 to 200 nm and is formed of Cr (chromium) or a Cr alloy. The soft magnetic layer 16 has a thickness of 50 to 300 nm and is formed of a Fe (iron) alloy or a Co (cobalt) alloy. The seed layer 18 has a thickness of 3 to 30 nm and is formed of CoO, MgO or NiO, for example.

The continuous recording layer 20 has a thickness of 5 to 30 nm and is formed of a CoCr (cobalt chromium) alloy.

The first mask layer 22 has a thickness of 3 to 50 nm and is formed of TiN (titanium nitride). The second mask layer 24 has a thickness of 3 to 30 nm and is formed of Ni (nickel). The resist layer 26 has a thickness of 30 to 300 nm and is formed of a negative type resist (NBE22A manufactured by Sumitomo Chemical Co., Ltd.).

The magnetic recording medium 30 is of a discrete track type on a perpendicular recording system. The recording layer 32 has a concavo-convex pattern obtained by dividing the continuous recording layer 20 into a number of recording elements 32A that are arranged in the radial direction at fine intervals to form concentric arcs. Here, the continuous recording layer 20 in a servo region of the magnetic recording medium 30 is divided into a number of recording elements in a predetermined servo pattern (not shown). Moreover, concave portions 34 between the recording elements 32A are filled with a non-magnetic material 36. Over the recording elements 32A and the non-magnetic material 36, a protective layer 38 and a lubricating layer 40 are formed in that order. Furthermore, a stop film 42 is formed on the upper surfaces and side faces of the recording elements 32A and on the bottoms of the concave portions 34.

The non-magnetic material 36 includes a lower non-magnetic film 36A and an upper non-magnetic film 36B formed in that order.

The material for both the lower non-magnetic film 36A and the upper non-magnetic film 36B is $SiO_2$ (silicon dioxide). The lower non-magnetic film 36A and the upper non-magnetic film 36B are substantially integrated with each other.

The material for the stop film 42 is hard carbon that may be called as diamond like carbon. In the present specification, the term "diamond like carbon" (hereinafter, simply referred to as "DLC") is used to mean a material that consists primarily of carbon, has an amorphous structure, and has hardness of approximately 200 to 8000 kgf/mm² in measurement of Vickers hardness. The stop film 42 formed of DLC has a lower etching rate for ion beam etching than the lower non-magnetic film 36A and the upper non-magnetic film 36B that are formed of $SiO_2$.

The material for the protective layer 38 is DLC, like the stop film 42. The lubricating layer 40 is formed of PFPE (perfluoro polyether).

Figure 3:
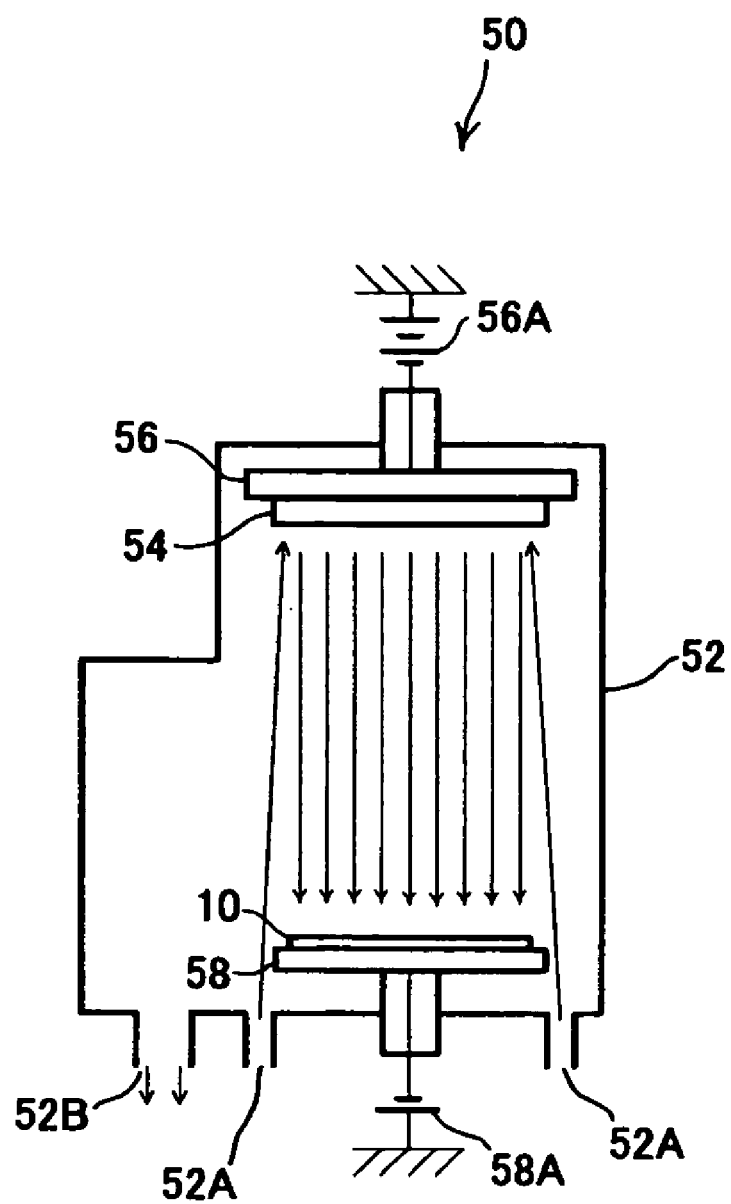
FIG. 3 is a side view schematically showing the general configuration of a bias sputtering apparatus used for manufacturing the magnetic recording medium.

The filling of the non-magnetic material 36 is carried out by means of a bias sputtering apparatus 50 shown in FIG. 3.

The bias sputtering apparatus 50 includes a vacuum chamber 52, a target holder 56 for holding a target 54 of $SiO_2$ (non-magnetic material) in the vacuum chamber 52, and an object holder 58 for holding the object to be processed 10 in the vacuum chamber 52.

The vacuum chamber 52 is provided with a supply hole 52A for supplying Ar (argon) gas as sputtering gas and an exhaust hole 52B for exhausting the sputtering gas.

To the target holder 56, a power supply 56A is connected by wiring. To the object holder 58, another power supply 58A is connected by wiring.

In the bias sputtering apparatus 50, a sputtering condition (deposition condition) including the magnitude of a bias voltage (the voltage of the power supply 58A), the pressure in the vacuum chamber 52, a distance between the target 54 and the object to be processed 10, and the like, can be adjusted. By adjusting the sputtering condition, the deposition rate can be adjusted.

Figure 4:
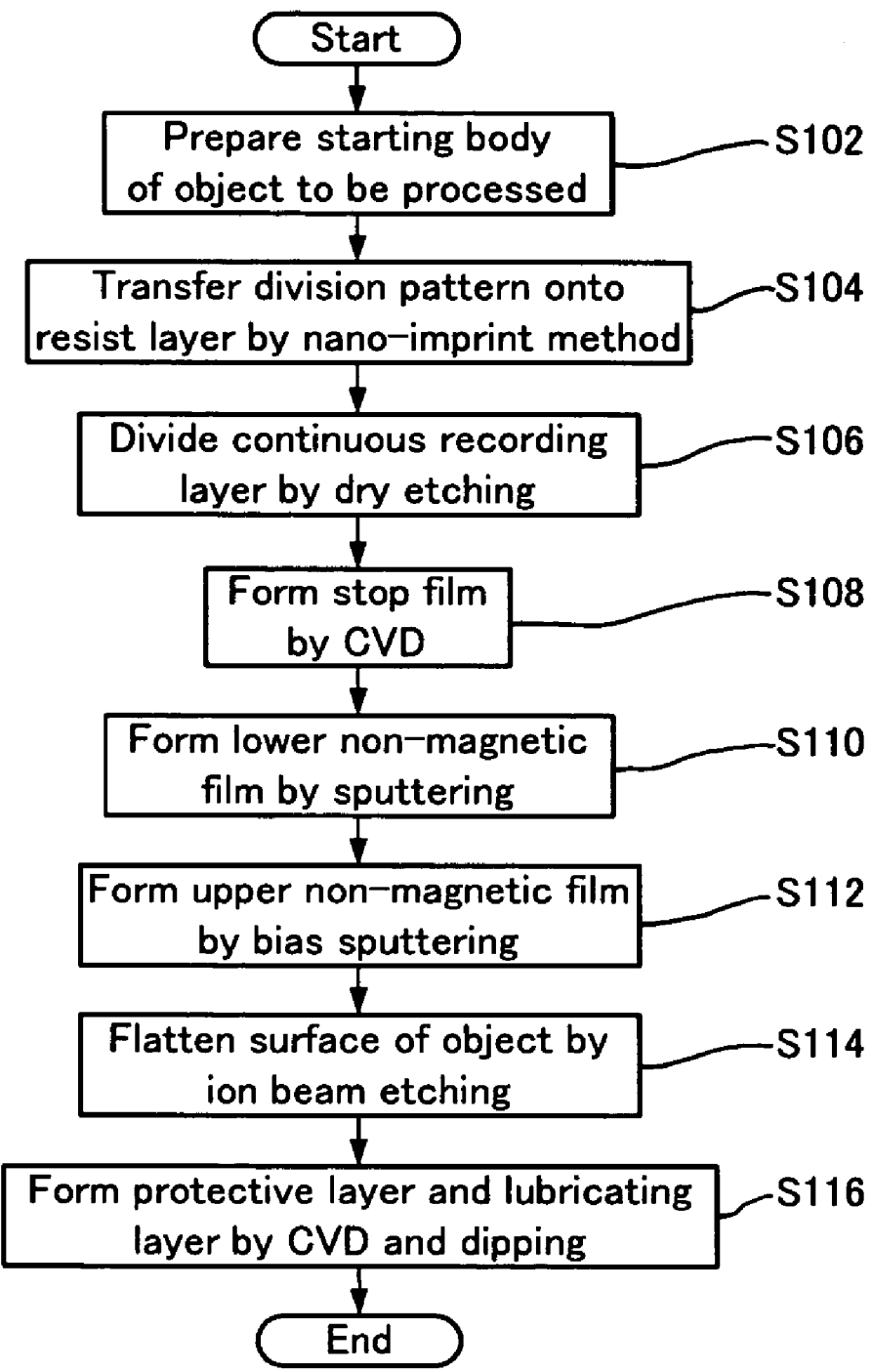
FIG. 4 is a flowchart generally showing a manufacturing step of the magnetic recording medium.

Next, a method for processing the object to be processed 10 is described with reference to a flowchart shown in FIG. 4.

First, a starting body of the object to be processed 10, shown in FIG. 1, is prepared (Step S102). The starting body is obtained by forming the underlayer 14, the soft magnetic layer 16, the seed layer 18, the continuous recording layer 20, the first mask layer 22, and the second mask layer 24 over the glass substrate 12 in that order by sputtering, and then applying the resist layer 26 by dipping. The resist layer 26 may be applied by spincoating.

Figure 5:
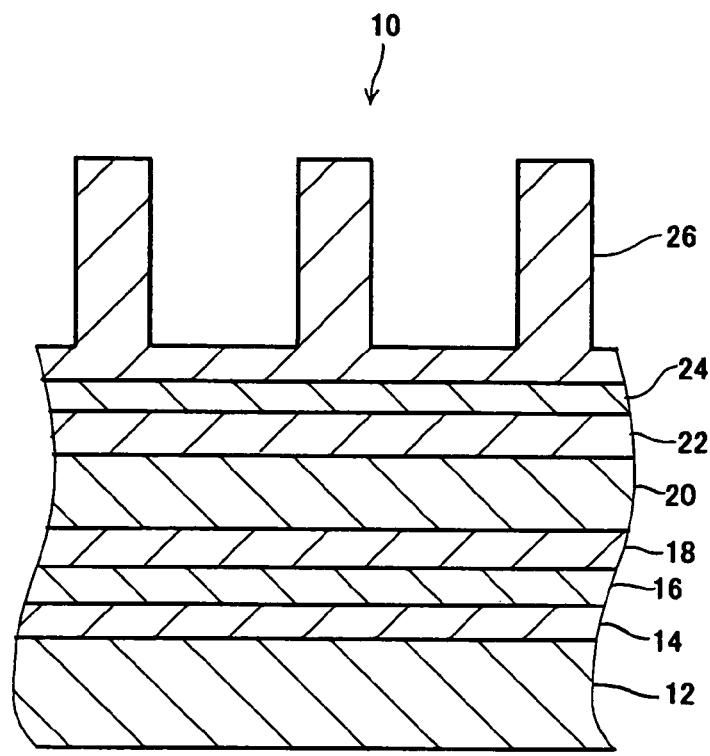
FIG. 5 is a side cross-sectional view schematically showing a shape of the object to be processed in which a concavo-convex pattern has been transferred onto a resist layer.

Then, a predetermined concavo-convex pattern corresponding to servo pattern (not shown) containing a contact hole and a division pattern of recording elements 32A arranged at fine intervals, shown in FIG. 5, are transferred onto the resist layer 26 of the starting body of the object to be processed 10 by a nano-imprint method by means of a transfer device (not shown) (Step S104). The concavo-convex pattern may be formed by exposing the resist layer 26 to light and developing the resist layer 26.

Figure 6:
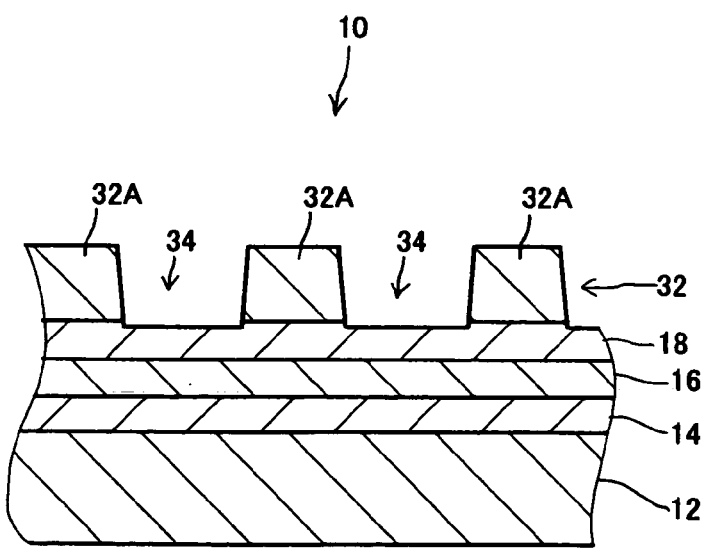
FIG. 6 is a side cross-sectional view schematically showing the shape of the object to be processed in which a continuous recording layer has been divided.

Next, the resist layer 26 on the bottoms of the concave portions is removed by ashing and thereafter the second mask layer 24 on the bottoms of the concave portions is removed by ion beam etching using Ar (argon) gas. Then, the first mask layer 22 on the bottoms of the concave portions is removed by reactive ion etching using $SF_6$ (sulfur hexafluoride) gas, and the continuous recording layer 22 on the bottoms of the concave portions is removed by reactive ion etching using CO gas and $NH_3$ gas as a reactive gas. As a result, the continuous recording layer 22 is divided into a number of recording elements 32A, so that a recording layer 32 having a concavo-convex pattern is formed, as shown in FIG. 6 (Step S106). The recoding element 32A is formed to have a shape in which the width thereof becomes narrower upward and the side face is inclined with respect to the upper surface to form a tapered angle different from 90□. Moreover, the first mask layer 22 may remain on the upper surface of the recording element 32A. Thus, the first mask layer 22 remaining on the recording element 32A is completely removed by reactive ion etching using $SF_6$ gas as a reactive gas, and thereafter $SF_6$ gas on the surface of the object to be processed 10 is removed by supplying a reducing gas such as $NH_3$ gas.

Figure 7:
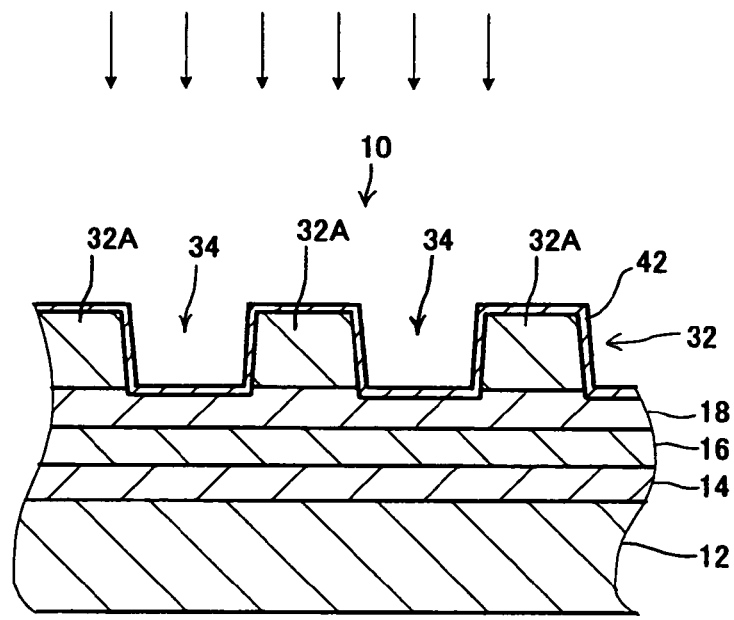
FIG. 7 is a side cross-sectional view schematically showing the shape of the object to be processed in which a stop film has been formed on the concavo-convex pattern.

Next, the stop film 42 formed of DLC is deposited on the upper surfaces and the side faces of the recording elements 32A to have a thickness of 1 to 2 nm by CVD, as shown in FIG. 7 (Step S108). The stop film 42 is also deposited on the bottom of the concave portions 34 between the recording elements 32A. Since no bias power is applied in this step, the recoding elements 32A are not etched.

Then, the concave portions 34 between the recording elements 32A are filled with $SiO_2$ particles in two steps by using the bias sputtering apparatus 50.

Figure 8:
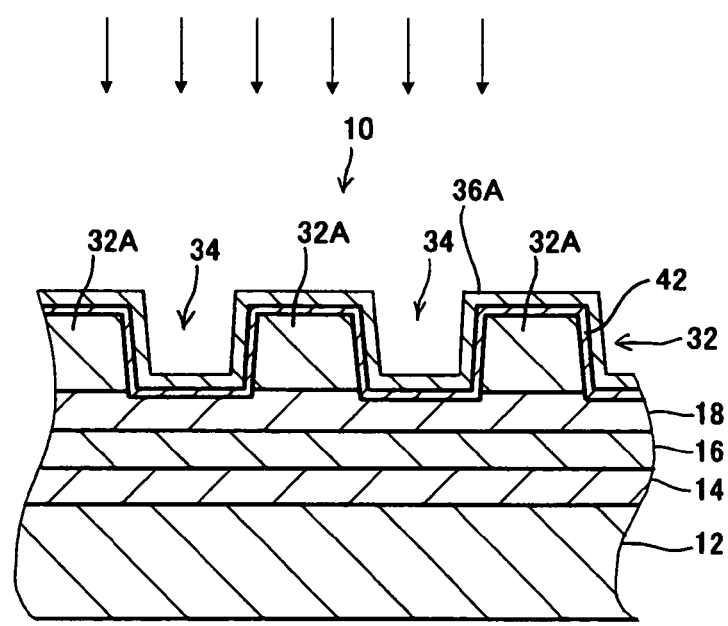
FIG. 8 is a side cross-sectional view schematically showing the shape of the object to be processed in which a lower non-magnetic film has been formed on the stop film.

First, the lower non-magnetic film 36A is formed while no bias power is applied (Step S110). More specifically, when a sputtering gas is supplied to the vacuum chamber 52 via the supply hole 52A while the object holder 58 holds the object to be processed 10 and no bias power is applied, the sputtering gas collides against the target 54 so as to cause $SiO_2$ particles to fly in all directions. This makes it possible to uniformly deposit $SiO_2$ particles on the surface of the object to be processed 10. As a result, as shown in FIG. 8, the lower non-magnetic film 36A is formed. It is preferable that the lower non-magnetic film 36A have a thickness of 1 nm or more. It is more preferable that the lower non-magnetic film 36A have a thickness of 3 nm or more. Since no bias power is applied in this step, the stop film 42 and the recording elements 32A are not etched.

Then, the upper non-magnetic film 36B is formed (Step S112). More specifically, a sputtering gas is supplied to the vacuum chamber 52 via the supply hole 52A while a certain bias power is applied to the object holder 58.

Figure 9A:
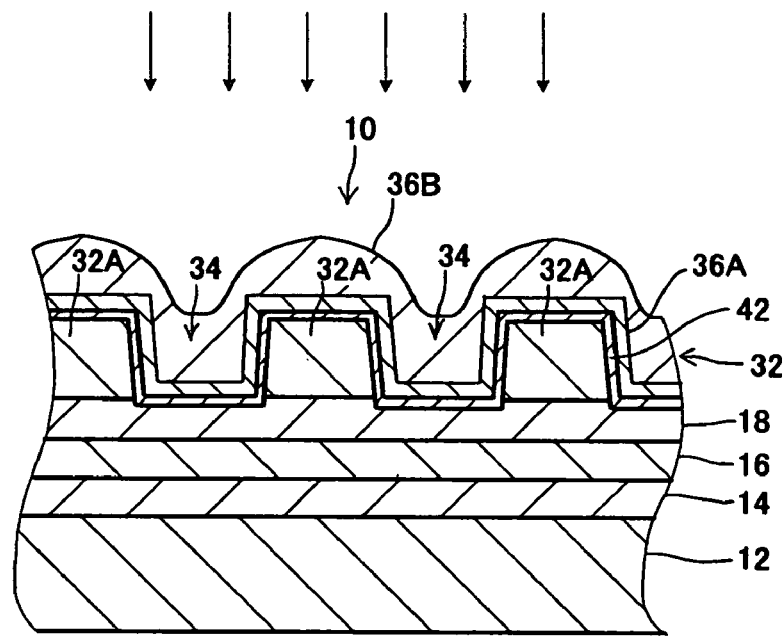
FIG. 9A is a side cross-sectional view schematically showing an action of deposition in formation of an upper non-magnetic film on the lower non-magnetic film.
Figure 9B:
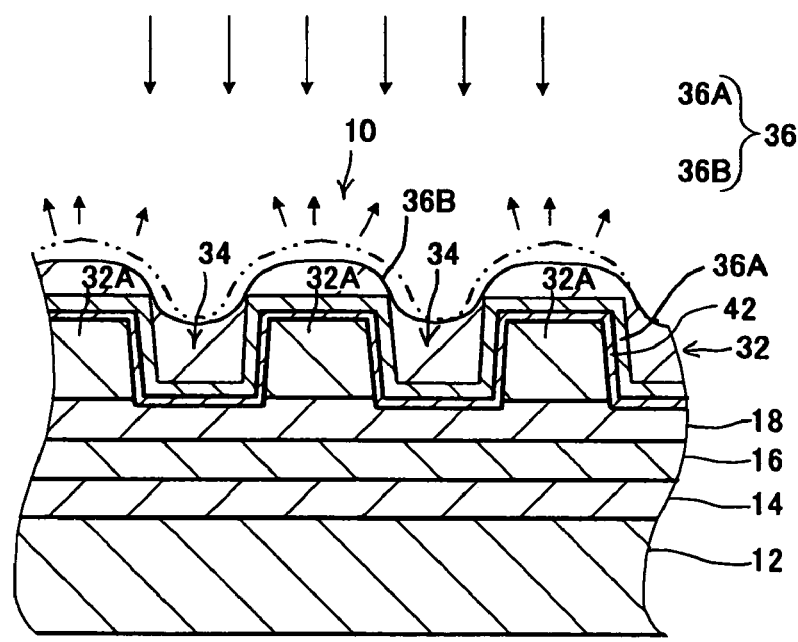
FIG. 9B is a side cross-sectional view schematically showing an action of etching in the formation of the upper non-magnetic film.

The sputtering gas tends to collide with the target 54 so as to cause $SiO_2$ particles to fly in all directions and deposit them uniformly over the concavo-convex pattern of the recording elements 32A. Thus, the surface of the upper non-magnetic film 36B tends to become concave and convex, as in the formation of the lower non-magnetic film (Step S110), as shown in FIG. 9A. However, by applying a bias voltage to the object holder 58 by the power supply 58A, the sputtering gas is attracted toward the object to be processed 10 by the bias voltage so as to collide with the deposited $SiO_2$ layer, thereby partially etching the deposited $SiO_2$ layer. This etching tends to remove selectively a projecting portion of the deposited $SiO_2$ layer faster than the other portions. Thus, the portion shown with chain double-dashed line in FIG. 9B are removed, so that the convex portions and the concave portions of the surface are gradually flattened. Incidentally, FIGS. 9A and 9B show the action of deposition and the action of etching caused by bias sputtering separately in order to help a reader understand those actions. However, those actions occur simultaneously in fact. Because the action of deposition occurs more than the action of etching, deposition of $SiO_2$ makes progress while the convex portion and the concave portion are suppressed to be small.

The thus deposited upper non-magnetic film 36B is formed from the same material as the lower non-magnetic film 36A. Therefore, the upper non-magnetic film 36B is integrated with the lower non-magnetic film 36A.

In this formation of the upper non-magnetic film 36B, the lower non-magnetic film 36A is partially etched. However, the recording elements 32A and the stop film 42 are protected from etching by the lower non-magnetic film 36A.

Figure 10:
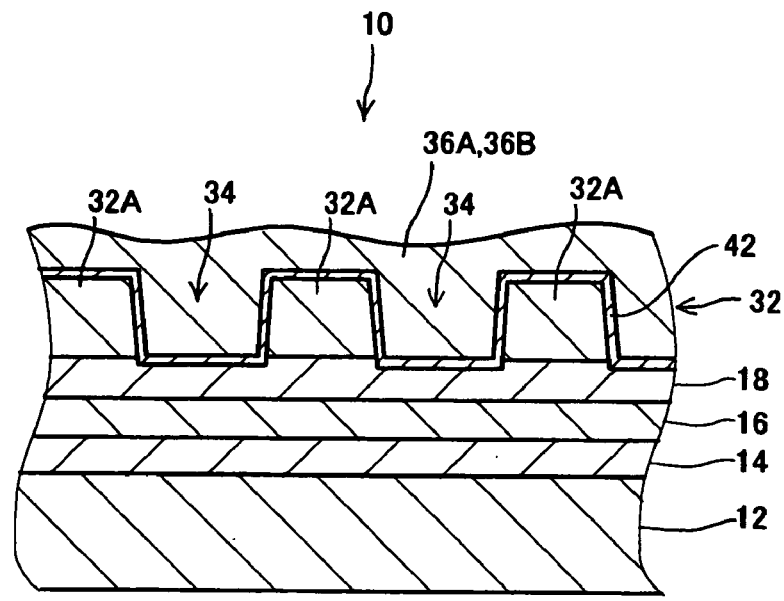
FIG. 10 is a side cross-sectional view schematically showing the shape of the object to be processed after the formation of the upper non-magnetic film.

As a result, as shown in FIG. 10, the non-magnetic material 36 is deposited in the form of a shape in which convex portions and concave portions are suppressed to be small, so as to cover the recording elements 32A. Moreover, the concave portions 34 are filled with the non-magnetic material 36.

Figure 11:
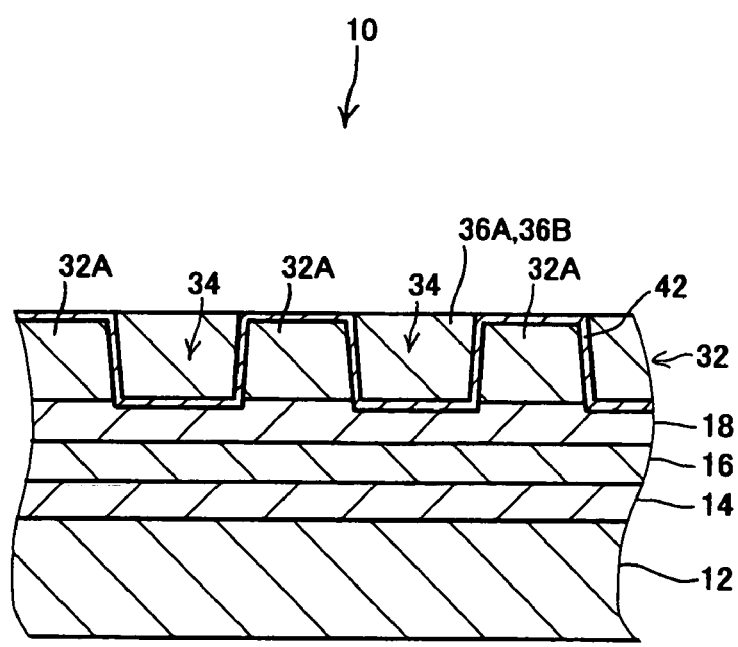
FIG. 11 is a side cross-sectional view schematically showing the shape of the object to be processed in which surfaces of recording elements and a non-magnetic material layer were flattened.

Next, the layer of the non-magnetic material 36 is removed by ion beam etching until etching reaches the upper surface of the stop film 42. In this manner, the surfaces of the recording elements 32A and the non-magnetic material 36 are flattened, as shown in FIG. 11 (Step S114). Since the stop film 42 is formed of DLC and has a lower etching rate in ion beam etching than $SiO_2$, the recording elements 32A are protected from ion beam etching. The stop film 42 may be removed partially. However, it is preferable to leave part of the stop film 42 on the upper surfaces of the recording elements 32A. By leaving the stop film 42 on the recording elements 32A, it is possible to surely protect the recording elements 32A from ion beam etching.

The non-magnetic material 36 is deposited to have a shape in which the convex portions and the concave portions on its surface are suppressed to be small in the forming step of the upper non-magnetic film (Step S112). Therefore, the convex portions and the concave portions on the surface of the non-magnetic material 36 can be surely flattened by ion beam etching.

In order to achieve the flattening with high precision, it is preferable that an incident angle of Ar ions used for ion beam etching set within a range of −10° to 15° with respect to the surface to be etched. On the other hand, in the case where the surface of the non-magnetic material 36 obtained a good flatness in the forming step of the upper non-magnetic film (Step S112), the incident angle of Ar ions may be set within a range of 30° to 90°. In this case, it is possible to increase the process rate, thus increasing production efficiency. Herein, the "incident angle" is used to mean an incident angle with respect to the surface of the object to be processed. More specifically, the incident angle is used to mean an angle formed by the surface of the object to be processed and a central axis of an ion beam. For example, in the case where the central axis of the ion beam is parallel to the surface of the object to be processed, the incident angle is 0°.

Next, the protective layer 38 of DLC is deposited to have a thickness of 1 to 5 nm on the upper surfaces of the recording elements 32A and the non-magnetic material 36 by CVD, and a lubricating layer 40 of PFPE is applied onto the protective layer 38 to have a thickness of 1 to 2 nm by dipping (Step S116). As a result, a magnetic recording medium 30 shown in FIG. 2 is completed.

As described above, the stop film 42 and the lower non-magnetic film 36A are formed over the recording elements 32A without applying a bias power. Thus, the recording elements 32A are not etched in the formation of the stop film (Step S108) and the formation of the lower non-magnetic film (Step S110). Therefore, magnetic characteristics of the recording elements 32A are not damaged. Moreover, since the upper non-magnetic film 36B is formed after the lower non-magnetic film 36A has been formed over the recording elements 32A (on the stop film 42), the recording elements 32A and the stop film 42 are protected from etching in the formation of the upper non-magnetic film (Step S112). Therefore, the magnetic characteristics of the recording elements 32A and the function of the stop film 42 are not degraded. Furthermore, since the stop film 42 having a lower etching rate in ion beam etching is formed on the recording elements 32A, the recording elements 32A is also protected from etching in the flattening step (Step S114) and therefore the magnetic characteristics thereof is not degraded. In other words, the magnetic characteristics of the recording elements 32A are not degraded even when the concave portions 34 are filled with the non-magnetic material 36 and the surface of the layer of non-magnetic material 36 is flattened. Therefore, the magnetic recording medium 30 has favorable accuracy of recording and reproduction.

In addition, the stop film 42 that is formed of DLC and has a relatively low etching rate in ion beam etching and the lower non-magnetic film 36A and the upper non-magnetic film 36B that are formed of $SiO_2$ and have a relatively high etching rate in ion beam etching are formed on the recording elements 32A. Thus, the lower non-magnetic film 36A and the upper non-magnetic film 36B over the recording elements 32A can be surely removed in the flattening step (Step S114). In this regard, the magnetic recording medium 30 is good in the recording and reproduction precision.

In the flattening step (Step S114), the stop film 42 is left on the recording elements 32A. Since the stop film 42 is formed of DLC having a low etching rate in ion beam etching, the layer thickness can be reduced thereby. Therefore, even if the stop film 42 is left on the recording elements 32A, the stop film 42 has a small effect on the recording and reproduction accuracy. On the other hand, in the case where the stop film 42 can be removed without damaging the recording elements 32A, the stop film 42 on the recording elements 32A may be completely removed in the flattening step (Step S114). In this case, a considerable effect of improving the recording and reproduction accuracy can be achieved.

Moreover, since the upper non-magnetic film 36B is formed while a bias power is applied to the object holder 58 in the forming step of the upper non-magnetic film (Step S112), it is possible to deposit the upper non-magnetic film 36B to have a shape in which convex portions and concave portions on its surface are suppressed to be small. Thus, it is possible to flatten the surfaces of the recording elements 32A and the non-magnetic material 36 efficiently and sufficiently in the flattening step (Step S114). Therefore, the protective layer 38 and the lubricating layer 40 can also be formed to be sufficiently flat, and the magnetic recording medium 30 is also good in head-flying properties.

In the present exemplary embodiment, the material for the lower non-magnetic film 36A and the upper non-magnetic film 36B is $SiO_2$. However, other non-magnetic materials, for example, other oxides, nitrides such as TiN (titanium nitride), Ta (tantalum), TaSi, and Si, may be used as long as it is suitable for the deposition method such as sputtering. Moreover, the material for the lower non-magnetic film 36A and that for the upper non-magnetic film 36B may be different from each other. In this case, it is preferable that etching rates of those materials in the flattening process (Step S114) be approximately the same.

Although the stop film 42 is made of DLC in the present exemplary embodiment, other non-magnetic materials may be used as the material for the stop film 42 as long as it has a low etching rate in the flattening step (Step S114).

In the present exemplary embodiment, the lower non-magnetic film 36A is formed without applying a bias power in the forming step of the lower non-magnetic film (Step S110). However, by forming the lower non-magnetic film 36A while substantially no bias power is applied, approximately the same effects can be achieved. The phrase "substantially no bias power is applied" is used to mean not only a case where no bias power is applied but also a case where a small bias power for which the effects of the action of etching on the recording elements 32A and the stop film 42 can be ignored is applied, for example a case in which a small bias power satisfying the relation of $0.9 \leq V_1/V_0$ is applied where a deposition rate of $SiO_2$ when no bias power is applied is $V_0$ (Å/min) and a deposition rate of $SiO_2$ in the formation of the lower non-magnetic film (Step S110) is $V_1$ (Å/min).

In addition, even in the case where a bias power for which $V_1/V_0$ is smaller than 0.9 is applied in the formation of the lower non-magnetic film, for example, by forming the lower non-magnetic film 36A while applying the bias power smaller than that applied in the formation of the upper non-magnetic film (Step S112), certain effects of protecting the recording elements 32A and the stop film 42 from etching by bias sputtering can be achieved.

In the present exemplary embodiment, the upper non-magnetic film 36B is deposited by bias sputtering and the concave portions 34 between the recording elements 32A are filled with the non-magnetic material 36 in the forming step of the upper non-magnetic film (Step S112). However, if the non-magnetic material can be deposited on the surface of the object to be processed while a bias power is applied to the object to be processed, the deposition method is not limited. For example, in the case where the upper non-magnetic film 36B is deposited by CVD, IBD or the like with application of a bias power, by forming the lower non-magnetic film 36A on the recording elements 32A in advance, the recording elements 32A and the stop film 42 can be protected from etching.

Similarly, in the present exemplary embodiment, the stop film 42 is formed by CVD and the lower non-magnetic film 36A is formed by sputtering. However, other deposition methods may be used for forming the stop film 42 and the lower non-magnetic film 36A as long as they do little damage to the recording elements 32A.

In the present exemplary embodiment, the stop film 42, the lower non-magnetic film 36A, and the upper non-magnetic film 36B are formed over the recording elements 32A in that order. However, the stop film 42 may be omitted, so that the lower non-magnetic film 36A and the upper non-magnetic film 36B can be formed directly on the recording elements 32A. In this case, it is also possible to suppress the convex portions and the concave portions on the surface of the upper non-magnetic film 36B to be small. Moreover, certain effects of protecting the recording elements 32A from the action of etching by bias sputtering in the formation of the upper non-magnetic film (Step S112) can be achieved.

In the present exemplary embodiment, the non-magnetic material 36 is removed by ion beam etching using argon gas until etching reaches the upper surfaces of the stop film 42, thereby flattening the surfaces of the recording elements 32A and the non-magnetic material 36. However, the non-magnetic material 36 may be removed by ion beam etching using rare gases such as Kr (krypton) and Xe (xenon), until etching reaches the upper surface of the stop film 42, thereby flattening the surfaces of the recording elements 32A and the non-magnetic material 36. Alternatively, the flattening may be achieved by reactive ion beam etching using a halogen gas such as $SF_6$, $CF_4$ (carbon tetrafluoride), and $C_2F_6$ (hexafluoroethane). Alternatively, the flattening may be achieved by etch-back method in which resist is applied so as to make its surface flat on the layer of the non-magnetic material after the deposition of the layer and then excess non-magnetic material is removed until etching reaches the upper surface of the stop film by ion beam etching, or by CMP (Chemical Mechanical Polishing).

In the present exemplary embodiment, the first mask layer 22, the second mask layer 24, and the resist layer 26 are formed over the continuous recording layer 20, and then the continuous recording layer 20 is divided by three-step dry etching. However, as long as the continuous recording layer 20 can be divided with high accuracy, the materials for the resist layer and the mask layers, the number and thickness of those layers, the type of dry etching, and the like, are not limited specifically.

In the present exemplary embodiment, the continuous recording layer 20 (recording layer 32) is formed of a CoCr alloy. However, the present invention can be applied to a process for a magnetic recording medium including recording elements formed from other materials, for example, other alloys containing iron group elements (Co, Fe (iron), Ni) or a layered product of those alloys.

In the present exemplary embodiment, below the continuous recording layer 20 (recording layer 32), the underlayer 14, the soft magnetic layer 16, and the seed layer 18 are formed. However, the structure below the continuous recording layer 20 (recording layer 32) can be appropriately changed in accordance with the type of the magnetic recording medium. For example, one or two of the underlayer 14, the soft magnetic layer 16, and the seed layer 18 may be omitted. Moreover, the continuous recording layer may be formed directly on the substrate.

In the present exemplary embodiment, the magnetic recording medium 30 is of a discrete track type on a perpendicular recording system in which the recording elements 32A are arranged in a radial direction of tracks at fine intervals. However, it is apparent that the present invention can be applied to manufacturing of a magnetic disc in which recording elements are arranged in a circumferential direction of tracks (direction of sectors) at fine intervals, a magnetic disc in which recording elements are arranged in both the radial direction and the circumferential direction of tracks at fine intervals, a PERM (Pre-Embossed Recording Medium) type magnetic disc including a continuous recording layer having a concavo-convex pattern formed thereon, and a magnetic disc having a spiral track. Moreover, the present invention can be also applied to manufacturing of a magneto optical disc such as an MO, a magnetic disc with thermal assistance that uses magnetism and heat, and a magnetic recording medium that includes a recording layer having a concavo-convex pattern but has a shape other than the disc shape, such as a magnetic tape.

EXAMPLE

As described in the above exemplary embodiment, nine objects to be processed 10 were processed. The same process was performed for all the objects to be processed 10 until the continuous recording layer 20 was divided (Step S106), so that the recording elements 32A having the following shape were formed.

Track pitch (pitch of the recording elements 32A in the radial direction): approx. 150 nm Width in the radial direction (width near the center in the thickness direction): approx. 90 nm Step (thickness of the recording element 32A): approx. 40 nm Tapered angle of the side face of the recording element 32A: approx. 80°

Then, the stop film 42 was uniformly formed on the upper surfaces and the side faces of the recording elements 32A and in the concave portions 34 between the recording elements 32A to have a thickness of approx. 2 nm by CVD.

Then, the lower non-magnetic film 36A was formed on the stop film 42 by sputtering while no bias power was applied, so as to have any of three kinds of thickness. More specifically, three objects to be processed 10 that were the same in the thickness of the lower non-magnetic film 36A were manufactured so that the thicknesses of the lower non-magnetic film 36A were approx. 1 nm, approx. 2 nm, and approx. 3 nm, respectively, to obtain nine objects in total. In this manufacturing, Ar gas was used as the sputtering gas, a deposition power (power applied to the target holder 56) was set to approx. 500 W, and the pressure in the vacuum chamber 52 was set to approx. 0.3 Pa.

Next, the upper non-magnetic film 36B was formed over the stop film 42 in each of the nine objects to be processed 10 by bias sputtering, while any of three bias powers was applied, so that the total thickness of the lower non-magnetic film 36A and the upper non-magnetic film 36B was approx. 50 nm. More specifically, the upper non-magnetic film 36B was formed for each of the three objects to be processed that were the same in the thickness of the lower non-magnetic film 36A, while three different bias powers of 150 W, 250 W, and 290 W were applied to those three objects to be processed, respectively. In the formation of the upper non-magnetic film 36B, Ar gas was used as the sputtering gas, the deposition power was set to approx. 500 W, and the pressure in the vacuum chamber 52 was set to approx. 0.3 Pa, as in the formation of the lower non-magnetic film (Step S110). The surface of the upper non-magnetic film 36B had a shape in which the convex portions and concave portions were suppressed to be small. Thus, a film thickness meter having an approximately flat face on which convex portions and concave portions could be ignored was placed near the object to be processed 10, and the total thickness of the upper non-magnetic film 36B and the lower non-magnetic film 36A, that were deposited on the film thickness meter and had the flat surface, was measured as the total thickness of the lower non-magnetic film 36A and the upper non-magnetic film 36B in the object to be processed 10.

In this state, observation for a cross section was performed by SEM (Scanning Electron Microscope), so that the tapered angle of the side face of the recording element 32A and the step between the convex portion and the concave portion on the surface of the layer of non-magnetic material 36 were measured. The measurement results were shown in Table 1.

TABLE 1

| | Step of forming lower non-magnetic film | | | Step of forming upper non-magnetic film | | | | | Tapered angle of | |
|---|---|---|---|---|---|---|---|---|---|---|
| | Bias power (W) | Deposition thickness (nm) | Deposition rate (Å/nm) | Bias power (W) | Deposition thickness (nm) | Deposition rate (Å/nm) | Total thickness (nm) | $V_2/V_1$ | side face of recording element (°) | Step on surface (nm) |
| Example | 0 | 1 | 45.08 | 150 | 49 | 34.50 | 50 | 0.77 | 80 | 25 |
| | 0 | 2 | 45.08 | 150 | 48 | 34.50 | 50 | 0.77 | 80 | 25 |
| | 0 | 3 | 45.08 | 150 | 47 | 34.50 | 50 | 0.77 | 80 | 27 |
| | 0 | 1 | 45.08 | 250 | 49 | 14.76 | 50 | 0.33 | 80 | 11 |
| | 0 | 2 | 45.08 | 250 | 48 | 14.76 | 50 | 0.33 | 80 | 12 |
| | 0 | 3 | 45.08 | 250 | 47 | 14.76 | 50 | 0.33 | 80 | 12 |
| | 0 | 1 | 45.08 | 290 | 49 | 6.28 | 50 | 0.14 | 70 | 3 |
| | 0 | 2 | 45.08 | 290 | 48 | 6.28 | 50 | 0.14 | 70 | 2 |
| | 0 | 3 | 45.08 | 290 | 47 | 6.28 | 50 | 0.14 | 80 | 3 |
| Comparative example 1 | — | 0 | — | 150 | 50 | 34.50 | 50 | — | 70 | 26 |
| | — | 0 | — | 250 | 50 | 14.76 | 50 | — | 70 | 11 |
| | — | 0 | — | 290 | 50 | 6.28 | 50 | — | 60 | 2 |
| Comparative example 2 | 0 | 50 | 45.08 | — | 0 | — | 50 | — | 80 | 32 |

Comparative Example 1

Unlike Example mentioned above, the upper non-magnetic film 36B was formed without forming the lower non-magnetic film 36A, i.e., directly on the stop film 42. Three objects to be processed 10 were processed. In the formation of the upper non-magnetic film 36B, three different bias powers, i.e., 150 W, 250 W, and 290 W were applied to the three objects to be processed 10, respectively. The concave portions 34 between the recording elements 32A were filled with the non-magnetic material 36, while the other conditions were the same as those in the above-mentioned Example.

For each of the three objects to be processed 10 thus obtained, a cross section was observed by SEM, so that the tapered angle of the side face of the recording element 32A and the step between the concave portion and the convex portion on the surface of the layer of non-magnetic material 36 were measured. The measurement results were shown in Table 1.

Comparative Example 2

Unlike Example of the exemplary embodiment mentioned above, the lower non-magnetic film 36A was formed to have a thickness of approx. 50 nm without applying the bias power. No upper non-magnetic film 36B was formed. The concave portions 34 between the recording elements 32A were filled with the non-magnetic material 36, while the other conditions were the same as those in the above-mentioned Example of the exemplary embodiment. For the thus obtained single object to be processed 10, a cross section was observed by SEM, so that the tapered angle of the side face of the recording element 32A and the step between the concave portions and the convex portions of the surface of the layer of non-magnetic material 36 were measured. The measurement results were shown in Table 1.

It is found from Table 1 that, in the case where the bias powers applied in the formation of the upper non-magnetic film (Step S112) were the same, the reduction amount of the tapered angle of the side face of the recording element 32A is smaller in Example in which the upper non-magnetic film 36B was formed after the lower non-magnetic film 36A having a thickness of 1 nm or more was formed on the stop film 42 without applying any bias power, than in Comparative Example 1 in which the upper non-magnetic film 36B was formed directly on the stop film 42. Thus, in Example, the recording element 32A and the stop film 42 were protected from etching in the formation of the upper non-magnetic film (Step S112). In other words, it was confirmed that, when the upper non-magnetic film 36B was formed after the lower non-magnetic film 36A having a thickness of 1 nm or more was formed, the certain effects of protecting the recording element 32A and the stop film 42 from etching in the formation of the upper non-magnetic film (Step S112) was achieved.

Moreover, it is found from Table 1 that, in the case where the upper non-magnetic film 36B was formed after the lower non-magnetic film 36A having a thickness of 3 nm was formed, the tapered angle of the side face of the recording element 32A was not reduced. In other words, it was confirmed that, when the upper non-magnetic film 36B was formed after the lower non-magnetic film 36A having a thickness of 3 nm or more was formed, the recording element 32A and the stop film 42 were protected from etching in the formation of the upper non-magnetic film (Step S112) substantially completely.

In addition, it was confirmed that the step on the surface was suppressed to be smaller in Example of the exemplary embodiment in which the upper non-magnetic film 36B was formed while the bias power was applied than in Comparative Example 2 in which only the lower non-magnetic film 36A having a thickness of approx. 50 nm was formed without applying the bias power. The step on the surface tends to become smaller as the bias power in the formation of the upper non-magnetic film (Step S112) becomes larger. However, assuming that the deposition rate of $SiO_2$ in the formation of the lower non-magnetic film (Step S110), where no bias power is applied, is $V_0$ (Å/min) and the deposition rate of $SiO_2$ in the formation of the upper non-magnetic film (Step S112) is $V_2$ (Å/min), when the bias power is increased to a level at which $V_2/V_0$ becomes excessively small, the upper non-magnetic film 36B peels off more easily. It was confirmed from experiments that such peeling of the upper non-magnetic film 36B did not occur when the bias power was adjusted to satisfy the relationship of $V_2/V_0 \geq 0.1$. Thus, in Example and Comparative Example 1, the bias power was adjusted to satisfy the above relationship.

What is claimed is:

1. A method for manufacturing a magnetic recording medium in which a recording layer is formed in a predetermined concavo-convex pattern over a substrate and concave portions of the concavo-convex pattern are filled with a non-magnetic material, the method comprising the steps of:
    forming a lower non-magnetic film over the concavo-convex pattern; and
    forming an upper non-magnetic film on the lower non-magnetic layer, to fill the concave portions of the concavo-convex pattern with the non-magnetic material wherein
    a bias power is applied to the substrate at least in the step of forming the upper non-magnetic film, and
    in the step of forming the lower non-magnetic film, the bias power is suppressed to be smaller than that in the step of forming the upper non-magnetic film.

2. The method for manufacturing a magnetic recording medium according to claim 1, wherein
    in the step of forming the lower non-magnetic film, the lower non-magnetic film is formed while substantially no bias power is applied.

3. The method for manufacturing a magnetic recording medium according to claim 2, wherein
    in the step of forming the lower non-magnetic film, the lower non-magnetic film is formed to have a thickness of 1 nm or more.

4. The method for manufacturing a magnetic recording medium according to claim 3, further comprising the step of flattening a surface of the upper non-magnetic film after the step of forming the upper non-magnetic film.

5. The method for manufacturing a magnetic recording medium according to claim 4, further comprising the step of forming a stop film on the recording layer before the step of forming the lower non-magnetic film, the stop film having a lower process rate in the step of flattening than those of the lower non-magnetic film and the upper non-magnetic film.

6. The method for manufacturing a magnetic recording medium according to claim 2, further comprising the step of flattening a surface of the upper non-magnetic film after the step of forming the upper non-magnetic film.

7. The method for manufacturing a magnetic recording medium according to claim 6, further comprising the step of forming a stop film on the recording layer before the step of forming the lower non-magnetic film, the stop film having a lower process rate in the step of flattening than those of the lower non-magnetic film and the upper non-magnetic film.

8. The method for manufacturing a magnetic recording medium according to claim 1, wherein in the step of forming the lower non-magnetic film, the lower non-magnetic film is formed to have a thickness of 1 nm or more.

9. The method for manufacturing a magnetic recording medium according to claim 8, further comprising the step of flattening a surface of the upper non-magnetic film after the step of forming the upper non-magnetic film.

10. The method for manufacturing a magnetic recording medium according to claim 9, further comprising the step of forming a stop film on the recording layer before the step of forming the lower non-magnetic film, the stop film having a lower process rate in the step of flattening than those of the lower non-magnetic film and the upper non-magnetic film.

11. The method for manufacturing a magnetic recording medium according to claim 1, further comprising the step of flattening a surface of the upper non-magnetic film after the step of forming the upper non-magnetic film.

12. The method for manufacturing a magnetic recording medium according to claim 11, further comprising the step of forming a stop film on the recording layer before the step of forming the lower non-magnetic film, the stop film having a lower process rate in the step of flattening than those of the lower non-magnetic film and the upper non-magnetic film.

* * * * *